United States Patent [19]

Bühler

[11] Patent Number: 4,564,950
[45] Date of Patent: Jan. 14, 1986

[54] GUARD ARRANGEMENT FOR A BOTTOM ELECTRODE OF A DIRECT-CURRENT ARC FURNACE

[75] Inventor: Karl Bühler, Nussbaumen, Switzerland

[73] Assignee: BBC Brown, Boveri & Company Limited, Baden, Switzerland

[21] Appl. No.: 633,983

[22] Filed: Jul. 24, 1984

[30] Foreign Application Priority Data

Jul. 28, 1983 [CH] Switzerland .................. 4133/83

[51] Int. Cl.⁴ .............................................. H05B 7/20
[52] U.S. Cl. ...................................... 373/108; 373/72
[58] Field of Search ................... 373/108, 72, 36, 37, 373/71, 101

[56] References Cited

U.S. PATENT DOCUMENTS 4,032,704 6/1977 Stenkvist ............................. 373/108

Primary Examiner—Roy N. Envall, Jr.
Attorney, Agent, or Firm—Oblon, Fisher, Spivak, McClelland & Maier

[57] ABSTRACT

A direct-current electric arc furnace for melting metals, including a furnace vessel and a bottom electrode mounted in the bottom of the furnace vessel. To prevent molten metal from contacting with current-carrying and liquid-cooled parts of the bottom electrode in the event of an unforeseen break-out of the furnace vessel bottom of the electric furnace, a shielding roof is provided as a guard between the furnace vessel bottom and the current-carrying and liquid-cooled parts. The shielding roof is formed in the shape of a truncated cone and is open downwards. The shielding roof is preferably rigidly joined to the furnace vessel bottom and is formed at least in part with a roof made of refractory material.

3 Claims, 1 Drawing Figure

GUARD ARRANGEMENT FOR A BOTTOM ELECTRODE OF A DIRECT-CURRENT ARC FURNACE

BACKGROUND OF THE INVENTION

1. Field of the Invention

The invention relates to an electric furnace, and more particularly to a d.c. arc furnace having a cooled bottom electrode and including at least one connecting piece located below the bottom of the furnace vessel.

2. Description of the Prior Art

A furnace of the above-noted type is known, for example, from Swiss Patent Specification No. 452,730.

Progress in the development of semi-conductor components in recent years has given an impetus to an increasing use of direct-current arc furnaces in the iron and steel industry for smelting, predominantly for smelting electric-furnace steel.

The construction and mode of action of direct-current arc furnaces are known, for example, from the journal "Stahl und Eisen", 103 (1983) No. 3, of Feb. 14th, 1983, pages 133 to 137.

For optimizing the electrical or thermal conditions, it has proven to be advantageous in a direct-current arc furnace to form the arc between one or more electrode(s) located above the melting material and the melting material itself. As the return line of the direct current, at least one electrode in the bottom of the furnace and in contact with the melt, namely the bottom electrode, is provided.

The bottom electrode is exposed to continuous, very high thermal stresses, for which materials having a high softening and melting point, for example graphite, are suitable. However, when carbon electrodes are used, the melt is carburized on the one hand. This is undesirable, however, in particular in the production of low-carbon steels. On the other hand, the carbon electrode is consumed, whereby the furnace bottom is weakened and the electric power transfer can be adversely affected.

According to the solution proposed by the above-noted Swiss Patent Specification No. 452,730, bottom electrodes are used, but have a zone also having the same chemical contents as the melt itself in contact with the melt. In this case, cooling takes place in the end zone, facing away from the furnace vessel, of the bottom electrode by convection with air, this end zone consisting of a metal having good heat-conducting and current-conducting properties, for example of copper. This is a so-called two-component bottom electrode.

On the one hand, this air-cooled two-component bottom electrode avoids, in the event of a break-out of the furnace hearth, the possibility of molten metal coming into contact with the liquid of a cooling arrangement or with current-bearing components of the bottom electrode below the furnace vessel bottom, and thus from the start eliminates the risk of unforeseen serious consequences. On the other hand, a relatively weak cooling effect must be accepted, which is by no means up to the demands which a continuously operating bottom electrode in industrial use must meet, namely for the following reasons:

The operation of an arc furnace is essentially characterized by five process stages:

| | |
|---|---|
| the charging phase | no power, low temperature |
| the fusion phase | high power, high temperature |
| the refining or purification phase | low power; high temperature |
| the tapping phase | no power; high temperature |
| the non-productive time phases | no power; medium-to-low temperature |

In particular the dissipation heat, generated in the fusion phase by the current, causes a greater heat flux in the bottom electrode, in particular in the direction of the furnace vessel bottom. Accordingly the intensity of the heat arising can vary within a relatively wide range between the charging phase and the refining or purification phase. However, this also means that the temperatures prevailing in the cooled zone of the bottom electrode can likewise vary within a relatively wide range. With a constant length of the bottom electrode, the differing heat flux in the bottom electrode can produce varying temperature differences between its cooled zone and its zone in contact with the melt. With more heat arising, however, there is no greater temperature difference, since the electrode cannot be warmer on the inside than the temperature of the melt, or, in other words, more heat can be transported only if the bottom electrode becomes shorter, that is to say melts off.

If, as is the case in a wide range with air cooling, the temperature of the cooling surface is substantially higher with more heat arising than with less heat arising, the greater quantity of heat can only be removed if the length of the bottom electrode is shortened even more, that is to say even more of the bottom electrode melts off. It follows that the change in position of the liquid/solid boundary layer between the melt and the bottom electrode extends over a relatively great length, as viewed in the axial direction. This change in position can manifest itself, on the one hand, by the bottom electrode "growing into" the melt or, as already stated, in a melting-off process in the direction of the furnace vessel bottom.

The process described above impairs the durability of the bottom electrode to a considerable extent and leads to premature destruction of the refractory lining, surrounding the bottom electrode, of the furnace vessel bottom. To ensure that the bottom electrode is operable at all under such unfavorable operating conditions, it must be correspondingly oversized. This in turn has an adverse effect on the dissipation power.

Furthermore, the cooler output must be adapted to the operational requirements. On the one hand, this can be increased by oversizing an air cooler. However, this would give unsatisfactory results in the long run.

On the other hand, liquid cooling would be outstandingly suitable for cooling a bottom electrode. In this case, however, appropriate protective measures must be taken to prevent liquid metal from coming into contact with cooling liquid.

Swiss Patent Specification No. 595,526 discloses a bottom electrode with liquid cooling, in which, however, the liquid cooling device extends through the furnace vessel bottom, for a considerable distance into the furnace interior.

This arrangement involves a considerable risk of liquid metal coming into contact with cooling liquid, in particular if melt has infiltrated the refractory lining of the furnace vessel bottom.

SUMMARY OF THE INVENTION

Accordingly, the objects of this invention are to provide a novel electric furnace of the type initially set out, in which the bottom electrode is adequately protected from issuing liquid metal in the event of unforeseen break-outs of the furnace vessel bottom, and a high degree of operational safety in furnace control is thus ensured.

These and other objects are achieved according to the invention by providing a novel electric furnace, in particular a direct-current arc furnace for melting metals, including a liquid cooling device for cooling a bottom electrode located below the furnace vessel bottom, wherein between the bottom of the furnace vessel and the cooling device there is provided a shielding roof serving as a guard against molten metal which may penetrate through the bottom of the furnace vessel.

In this way, the liquid metal issuing in the event of a break-out of the furnace vessel bottom in the vicinity of the bottom electrode is prevented from reaching the cooled parts of the bottom electrode, and is led away.

Furthermore, the shielding roof serves as a protection for the supply pipes and hoses for the cooling arrangement and for the electric current leads and the like. The bottom electrode can here be cooled either directly with cooling liquid or indirectly by the contact surfaces of a separate cooling device.

In a further development of the subject of the invention, the shielding roof consists of metal or at least partially of refractive material, it is formed in the shape of a truncated cone and is provided with an opening, i.e., the shielding roof is opened downwards and the bottom electrode protrudes through the opening of the shielding roof.

Furthermore, at least the upper surface of the shielding roof is preferably provided with a lining of refractory material. This constructional arrangement allows a simple build-up of the guard device and additionally guarantees that, even if relatively large quantities of molten metal issue from the furnace vessel bottom, the cooling arrangement and the electrical connection parts of the bottom electrode are adequately protected.

Further according to the invention, the liquid cooling device is constructed as a connecting piece and preferably as a contact sleeve, consisting of copper, and is provided with cooling channels for liquid cooling, which are closed off from the electrode. Preferably, the contact surfaces of the contact sleeve widen in the direction of the furnace vessel bottom, and the bottom electrode is supported on the contact surfaces of the contact sleeve. The shielding roof according to the invention, with a cover of refractory material above the location of the liquid-cooled contact sleeve and below the furnace vessel bottom, ensures in every case that, in the event of a furnace vessel break-out, the molten metal is prevented from reaching the liquid-cooled parts and, instead, is led away. Moreover, the supply pipes or hoses of the liquid cooling arrangement and water-cooled power leads are protected from molten metal.

Another advantage of the invention resides in the provision of the liquid cooling only in the electrical connecting piece and not in the electrode itself, with the connecting piece consisting of a material of very high thermal conductivity, preferably copper. This counteracts undue melting of the material by the melt or, with a sufficiently high rate of the cooling liquid flow, makes this impossible (indirect cooling).

As a further protective measure, according to a further development of the invention, temperature monitoring, of the type known per se, for monitoring of the temperature the bottom electrode itself is provided, for example by means of thermocouples, such as bi-metal thermostats or the like, by which penetration of the melt directly in or on the bottom electrode is detected and measures, such as, for example, shutting off the cooling liquid or casting of the melt out of the furnace can be initiated immediately.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawing, wherein.

DESCRIPTION OF THE PREFERRED EMBODIMENTS

Figure 1:
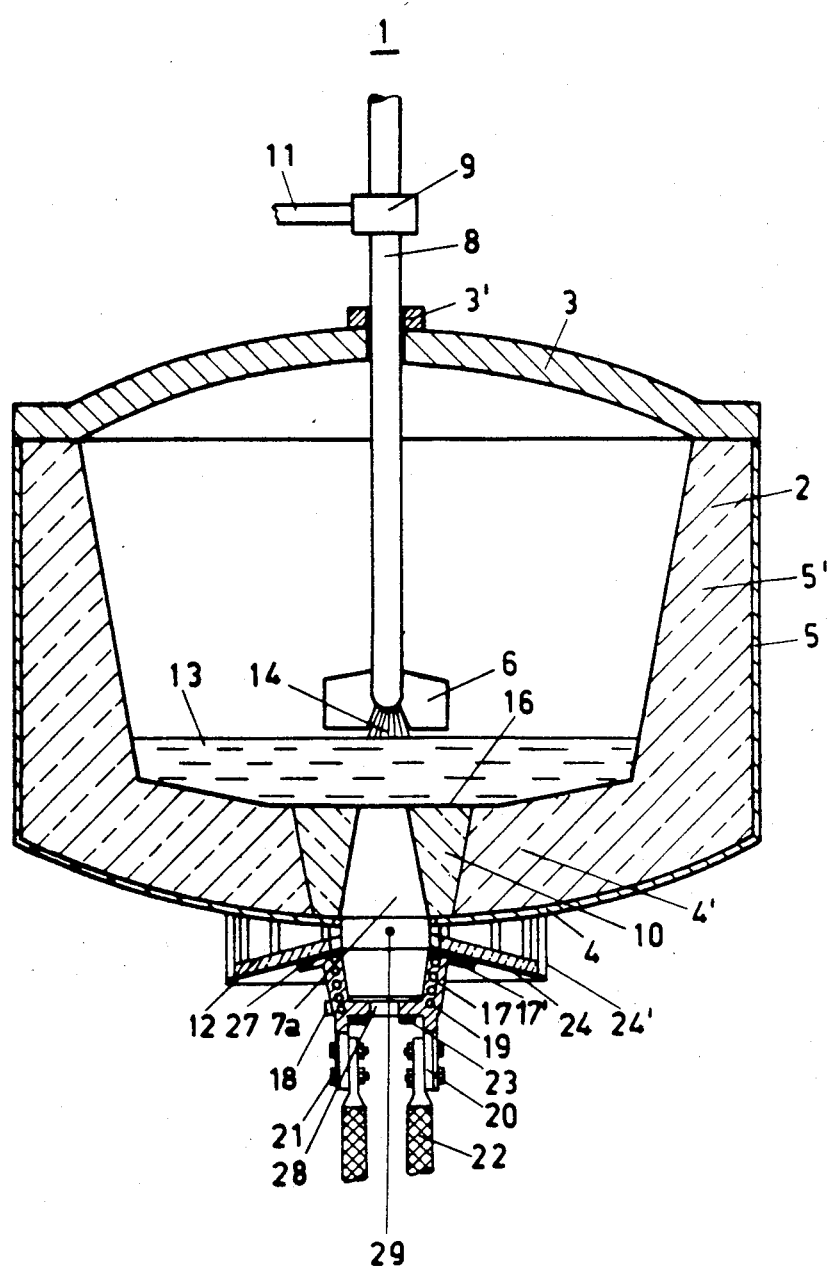
FIG. 1 is a vertical cross-sectional view through the electrical furnace including the bottom electrode according to the invention.

Referring now to the drawing,

FIG. 1 shows the arc furnace 1 with the furnace vessel 2 in the furnace cover 3, the furnace vessel 2 consisting of the vessel bottom 4, the vessel wall 5, the refractory lining 4' of the furnace bottom 4 and the refractory lining 5' of the vessel wall 5. Above the molten bath 13, a carbon electrode 8 protruding through an opening in the furnace cover 3 is provided. A cooling ring 3' is provided for cooling the electrode 8. The electrode 8 is mounted in a holder 9 of an electrode-carrier arm 11. The electrode-carrier arm 11 is in turn connected to an electrode regulation device not shown in FIG. 1.

In the furnace vessel 5,5', there is a furnace door 6, and an arc 14 is formed between the electrode 8 and the molten bath 13.

In the vessel bottom 4, 4', the bottom electrode 7a according to the invention can be seen. Electrode 7a is enclosed sleeve-like by the part 10 consisting of refractory material. In the exemplary embodiment according to FIG. 1, the bottom electrode 7a has a conical shape which tapers in the direction of the vessel interior and which extends from the furnace vessel bottom 4 up to the furnace hearth surface 16. In contrast to the tapering shape of the bottom electrode 7a, the part 10 widens in the direction of the vessel interior. Below the furnace vessel bottom 4, the bottom electrode 7a is held by a water-cooled connecting piece 17 which is constructed as a contact sleeve and serves at the same time for connecting the electric power supply. The bottom electrode 7a is fixed to the end face of the connecting piece 17 by means of a bolted connection 23. The conically shaped contact surfaces of the bottom electrode 7a rest on the likewise conical inner contact surfaces of the connecting piece 17 serving as a contact sleeve, which widen towards the furnace bottom 3, which produces a good electrical connection and heat conduction between the two parts 7a and 17. Contact lugs 20 formed integrally with the contact sleeve are located on the connecting piece 17.

FIG. 1 shows a part of the electric power supply cable 22 which is connected by means of the bolted connection 21 to the contact lugs 20 of the connecting piece 17. The connecting piece 17 is provided with cooling channels 19, which are closed off from the electrode 7a, and with a cooling channel inlet branch 18. A cooling liquid, primarily water, is fed to the cooling channels 19 through the inlet branch 18. It flows upwards in a helical arrangement through the cooling channels 19 of the connecting piece 17 and thus cools the bottom electrode 7a in an indirect manner. The cooling liquid outlet branch of the connector 17 is located in the same plane as the inlet branch 18 and can therefore not be seen in FIG. 1.

The bottom electrode 7a is mounted by means of a fixing part which consists of a metallic shielding roof 24 in the shape of a truncated cone and of vertical holding crossbars 24'. The shielding roof 24 is arranged at least substantially centrally relative to the furnace axis and opens downwards towards the bottom, and is rigidly joined to the furnace vessel bottom 4 by means of the holding crossbars 24'. The bottom electrode 7a protrudes through the opening of the shielding roof and is supported on the connecting piece 17, which is fixed to the underside of the shielding roof 24 with the insertion of an electrically insulating interlayer 27.

Should it be necessary to remove the bottom electrode, only the bolted connection 23 is undone. For example, a bolt (not shown in FIG. 1) of an ejection device, is placed, on the end face of the bottom electrode 7a facing away from the vessel interior, through the perforation 28 in the end face 28 of the connecting piece 17 onto the end face of the bottom electrode 7a, and the force required for the ejection step is applied to the bottom electrode 7a together with the part 10 completing it. In this way, the bottom electrode together with the part 10 surrounding it can readily be removed from the outside into the furnace vessel interior. Since, in contrast to the end face of the bottom electrode on the melt side, the end face against the ejection ram bears is precisely defined, the ejection of the bottom electrode from the furnace vessel bottom 4, 4' can be repeated in every case with good reproducibility.

Obviously, numerous modifications and variations of the present invention are possible in light of the above teachings. It is therefore to be understood that within the scope of the appended claims, the invention may be practiced otherwise than as specifically described herein.

I claim:

1. A direct-current electric arc furnace for melting metals, comprising:
   a furnace vessel having a bottom;
   at least a pair of electrodes, including a bottom electrode mounted in the bottom of said vessel,
   means for cooling said bottom electrode; and
   a shielding roof provided as a guard against molten metal which may penetrate through the bottom of said vessel, said shielding roof mounted between the bottom of the furnace vessel and the cooling means.

2. An electric furnace according to claim 1, comprising:
   said shielding roof having a truncated-cone-like shape expanding from a first opening closest to said vessel bottom to larger second opening farther away from said vessel bottom; and
   said bottom electrode projecting through said first opening of the shielding roof.

3. An electric furnace according to claim 1 or 2, wherein said shielding roof has an upper surface facing said furnace bottom and at least the upper surface of the shielding roof comprises refractory material.

* * * * *